United States Patent [19]

Kitagishi et al.

[11] Patent Number: 4,844,602
[45] Date of Patent: Jul. 4, 1989

[54] OPTICAL SYSTEM FOR DEFLECTING IMAGE

[75] Inventors: Nozomu Kitagishi, Tokyo; Shoichi Yamazaki, Kanagawa, both of Japan

[73] Assignee: Canon Kabushiki Kaisha, Tokyo, Japan

[21] Appl. No.: 116,541

[22] Filed: Nov. 4, 1987

[30] Foreign Application Priority Data

Nov. 4, 1986 [JP]  Japan ................ 61-262115
Nov. 26, 1986 [JP] Japan ................ 61-282371

[51] Int. Cl.$^4$ .......................................... G02B 27/64
[52] U.S. Cl. .................................. 350/500; 356/248; 356/250
[58] Field of Search ............... 350/500; 356/248, 250

[56] References Cited

U.S. PATENT DOCUMENTS

| | | | |
|---|---|---|---|
| 3,212,420 | 10/1965 | De La Cierva | 350/500 |
| 3,378,326 | 4/1968 | Alvarez | 350/500 |
| 3,531,176 | 9/1970 | Humphrey | 350/500 |
| 3,704,954 | 12/1972 | Huther et al. | 350/500 |
| 3,761,157 | 9/1973 | Humphrey | 350/500 |
| 3,942,862 | 3/1976 | Furukawa et al. | 350/500 |
| 3,944,325 | 3/1976 | Humphrey | 350/500 |
| 3,953,106 | 4/1976 | Furukawa et al. | 350/500 |
| 4,131,333 | 12/1978 | Humphrey | 350/500 |

FOREIGN PATENT DOCUMENTS

| | | | |
|---|---|---|---|
| 50-80147 | 8/1975 | Japan | |
| 56-21133 | 5/1981 | Japan | |
| 56-34847 | 8/1981 | Japan | |
| 57-7414 | 2/1982 | Japan | 350/500 |
| 57-7415 | 2/1982 | Japan | |
| 57-7416 | 2/1982 | Japan | |

Primary Examiner—Rodney B. Bovernick
Assistant Examiner—Martin Lerner
Attorney, Agent, or Firm—Fitzpatrick, Cella, Harper & Scinto

[57] ABSTRACT

In the stabilized optical system against vibratory motions, a front lens unit restrained from movement in a direction perpendicular to the optical axis is followed rearwardly by a movable lens unit for decentering away from the optical axis to compensate for the image shift resulting from the vibratory motion, satisfying the following conditions:

$$4F_T < |F_1|$$

$$0.25F_T < |F_2| < 0.8F_T$$

where $F_1$ and $F_2$ are the focal lengths of the front and movable lens units respectively, and $F_T$ is the focal length of the entire lens system.

16 Claims, 9 Drawing Sheets

OPTICAL SYSTEM FOR DEFLECTING IMAGE

BACKGROUND OF THE INVENTION

1. Field of the Invention

This invention relates to photographic optical systems and, more particularly, to an optical system for deflecting the image to obtain a stabilized picture when tracking or following the movement of an object or against accidental motion of the photographic instrument.

2. Description of the Related Art

When taking pictures from a moving vehicle such as a running car or a flying aircraft, vibrations are conveyed to the photographic system and its image is caused to accidentally displace. For a given vibration amplitude, the longer the focal length of the photographic system, the larger the degree of displacement of the image becomes.

Vibration-proof optical systems having the function of stabilizing the photographic system's image have been proposed in, for example, Japanese Patent Publications Nos. Sho 56-34847, 57-7414 and 57-7416 and U.S. Pat. Nos. 3,212,420 and 3,378,326.

In these proposals, the photographic system is provided in part with an optical member arranged to remain spatially stationary against vibrations, and the vertical angle is made to change in relation to the vibration of this optical member so that the image is stabilized.

However, such change of the vertical angle gives rise to a problem that the image plane is inclined away from the film surface. Also, the vertical angle must be changed to suit to the motion of the image. This leads to another problem of response characteristics.

Meanwhile, a concrete driving mechanism for stabilizing the image is disclosed in U.S. Pat. application Ser. No. 896,639. The image-stabilizing method used therein is based on the parallel decentering of a lens unit which constitutes part of the photographic system. Since, according to this method, the image is moved vertically on the film plane in response to decentering, the image displacement due to the tilting of the photographic system can be averted.

In order to achieve good stability of the image, on the other hand, it is required that the responsiveness is sufficiently high. It should be recognized here that this requirement can be fulfilled by reducing the size of the lens unit for decentering, but high grade imagery becomes difficult to preserve since that size reduction generally leads to increase the difficulty of well correcting those of the image aberrations which are produced by the decentering, or the so-called decentering aberrations.

Particularly in the above-cited application Serial No. 896,639, concerning the lens design standpoint, that is, simultaneous fulfillment of both requirements of improving both the compactness of the optical system and the optical performance, this problem is not addressed.

SUMMARY OF THE INVENTION

A first object of the present invention is to maintain the optical performance excellent at the deflection of the image.

A second object is to make a good compromise of the first object with a compact form of optics and to provide a lens system of high response characteristic.

Further objects of the invention will become apparent from the following description in conjunction with the drawings.

BRIEF DESCRIPTION OF THE DRAWINGS

Of the graphs, FIGS. 4(A), 5(A) and 6(A) show the aberration before the movable lens decentering, and FIGS. 4(B), 5(B) and 6(B) show those after the movable lens is decentered by 2mm. Y denotes the image height, M the meridional image surface; S the sagittal image surface; and d and g are the spectral d- and g-lines respectively.

DETAILED DESCRIPTION OF THE PREFERRED EMBODIMENTS

Figure 1:
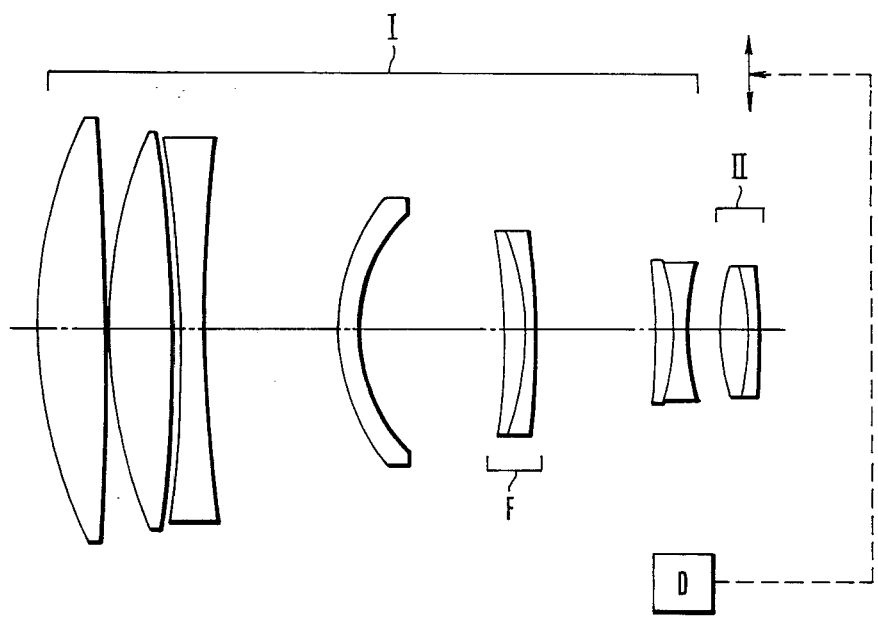
FIGS. 1, 2 and 3 are longitudinal section views of numerical examples 1, 2 and 3 of lenses of the invention respectively.
Figure 2:
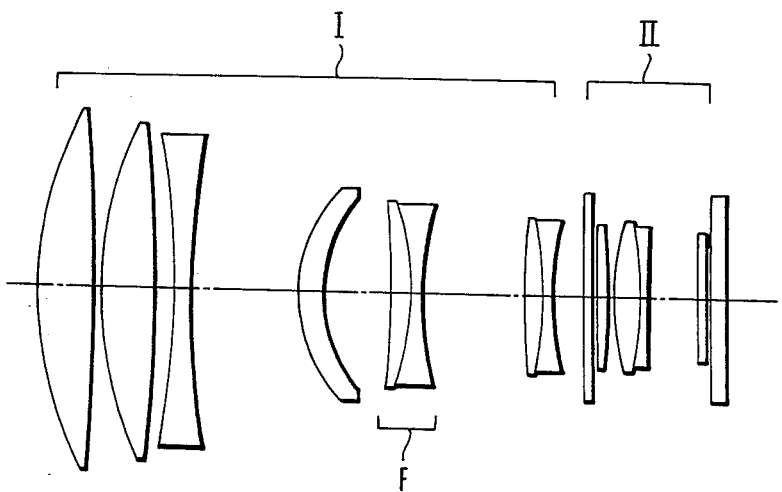
Figure 3:
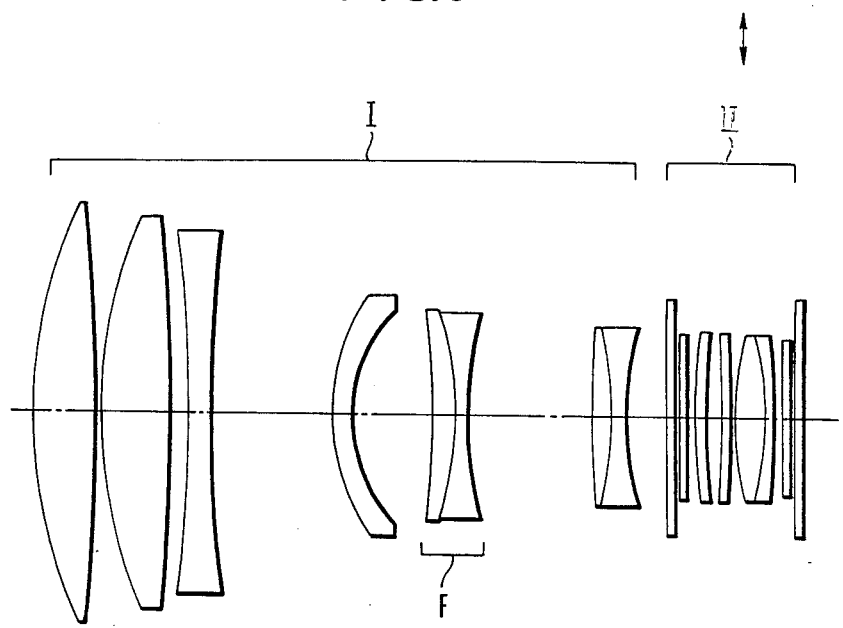

In FIGS. 1 to 3 there is shown one embodiment of the invention as applied to the photographic lens comprising; from front to rear, a fixed lens unit I stationary in the direction perpendicular to the optical axis and a movable lens unit II upon movement in a direction perpendicular to the optical axis to compensate for the image displacement. The movable lens unit II is assumed to be driven by a similar actuator to that shown in the above-cited application Ser. No. 896,639. F is a focusing member movable along the optical axis. A detector D shown in only FIG. 1 produces an output representing the acceleration of the optical system, in accordance with which the actuator controls the driving operation.

In this embodiment, the invention sets forth rules of design that the movable lens unit is constructed with at least one positive lens element and at least one negative lens element, and that the following conditions are satisfied:

$$4 F_T < |F_1|$$
$$0.25 F_T < |F_2| < 0.8 F_T \quad (1)$$

where $F_1$ and $F_2$ are the focal length of the fixed and movable lens units I and II, and $F_T$ is the focal length of the entire lens system.

When these features are satisfied, the deterioration of the optical performance resulting from the compensation for the image displacement is reduced.

For note, though this embodiment is not illustrated in connection with the image magnification varying function, say the zoom lens, it is to be understood that the present invention is applicable also to zoom lenses. In this case, $F_T$ should be taken at the longest focal length.

Next, on the amounts of decentering aberrations produced by decentering the movable lens to compensate for the image displacement, explanation should be made here from the standpoint of the theory of aberration with the formulae Yoshiya Matsui presented to the 23rd Applied Physics Lecture Meeting (in the year of 1962) in Japan. According to Matsui's theory, for the photographic lens partly decentered by a movement E without being tilted, the amount of aberration $\Delta'$ of the entire lens system can be expressed by the sum of the amount of aberration $\Delta Y$ which existed before the decentering and the amount of aberration $\Delta Y(E)$ which is produced by the decentering, as shown in a formula (a) below.

$$\Delta'Y = \Delta Y + \Delta Y(E) \quad \text{(a)}$$

This decentering aberration $\Delta Y(E)$ is expressed by the following equation (b) in terms of the primary decentering coma (IIE), the primary decentering astigmatism (IIIE), the primary decentering curvature of field (PE), the primary decentering distortion (VE1), the primary decentering distortional surplus aberration (VE2), the secondary decentering astigmatism (IIIE$^2$), the secondary decentering field curvature (PE$^2$) secondary decentering distortion (VE$^2$1), the secondary decentering distortional surplus aberration (VE$^2$ 2), the primary original point shift (AE) and the tertiary original point shift ($\Delta E^3$).

$$\Delta Y(E) = -\frac{E}{2\alpha_K'}\{R^2(2+\cos 2\phi_R)(IIE) + \quad \text{(b)}$$
$$2R(N,\tan W)[\{2\cos(\phi_R - \phi_W) + \cos(\phi_R + \phi_W)\}(IIIE) +$$
$$\cos\phi_R\cos\phi_W(PE)] + (N,\tan W)^2\{(2+\cos\phi_W)(VE1) - (VE2)\}\} -$$
$$\frac{E^2}{2\alpha_K'}[(N,\tan W)\cos\phi_W\{3(VE^2 1) - 2(VE^2 2)\} +$$
$$R\cos\phi_R\{3(IIIE^2) + (PE^2)\}] - \frac{1}{2\alpha_K'}\{E(\Delta E) + E^3(\Delta E^3)\}$$

For the photographic lens comprised of two lens units of which the first counting from front is fixed, and the second is movable in a direction perpendicular to the optical axis, and has the angle of incidence $\alpha_P$ and the angle of emergence $\alpha'_P$ the general individual expressions for the aberrations (IIE), (IIIE), (PE), (VE1), (VE2), (IIIE$^2$), (PE$^2$), (VE$^2$ 1), (VE$^2$2), ($\Delta E$) and ($\Delta E^3$) are given by the following equations (c) to (m) in terms of the aberration coefficients $I_P$, $II_P$, $III_P$, $P_p$ and $V_P$.

$$(IIE) = -\alpha_P II_P + \alpha'_P I_P \quad \text{(c)}$$
$$(IIIE) = -\alpha_P III_P + \alpha'_P II_P \quad \text{(d)}$$
$$(PE) = -\alpha_P P_P \quad \text{(e)}$$
$$(VE1) = -\alpha_P V_P + \alpha'_P III_P \quad \text{(f)}$$
$$(VE2) = -\alpha'_P P_P \quad \text{(g)}$$
$$(IIIE^2) = \alpha_P^2 III_P - 2\alpha_P\alpha'_P II_P + \alpha'^2_P I_P \quad \text{(h)}$$
$$(PE^2) = \alpha_P^2 P_P \quad \text{(i)}$$
$$(VE^2 1) = \alpha_P^2 V_P - 2\alpha_P\alpha'_P III_P + \alpha'^2_P II_P \quad \text{(j)}$$
$$(VE^2 2) = \alpha_P^2 \alpha'_P P_P \quad \text{(k)}$$
$$(\Delta E) = -2(\alpha'_P - \alpha_P) \quad \text{(l)}$$
$$(\Delta E^3) = -\alpha_P^2\{\alpha_P V_P - \alpha'_P(III_P + P_P)\} + \quad \text{(m)}$$
$$2\alpha_P\alpha'_P\{\alpha_P III_P - \alpha'_P II_P\} - \alpha'^2_P\{\alpha_P II_P - \alpha'_P I_P\}$$

Suppose here that, as the refractive power of the fixed lens unit I falls in the range defined by the inequality of condition (1), the angle of incidence $\alpha_P$ takes a small value, then the terms related to the incidence angle $\alpha_P$ in the equations (c) to (m) may be ignored. Hence, (IIE) to ($\Delta E^3$) can finally be approximated respectively by equations (c') to (m') below.

$$(IIE) = \alpha'_P I_P \quad \text{(c')}$$
$$(IIIE) = \alpha'_P II_P \quad \text{(d')}$$
$$(PE) = 0 \quad \text{(e')}$$
$$(VE1) = \alpha'_P III_P \quad \text{(f')}$$
$$(VE2) = -\alpha'_P P_P \quad \text{(g')}$$
$$(IIIE^2) = \alpha'^2_P I_P \quad \text{(h')}$$
$$(PE^2) = 0 \quad \text{(i')}$$
$$(VE^2 1) = \alpha'^2_P II_P \quad \text{(j')}$$
$$(VE^2 2) = 0 \quad \text{(k')}$$
$$(\Delta E) = -2\alpha'_P \quad \text{(l')}$$
$$(\Delta E^3) = -\alpha'^3_P I_P \quad \text{(m')}$$

Upon comparison of the equations (c) to (k) for the decentering aberrations with the corresponding ones (c') to (k'), it is obvious that in order that the decentering coma, decentering astigmatism and decentering field curvature which largely affect the image quality are little produced, the movable lens unit must be corrected for spherical aberration, coma, astigmatism and Petzval sum all to a minimum. It is, therefore, usual to increase the necessary number of constituent lens elements in the movable unit. If the lens is, however, designed in such a way as to minimize the angle of incidence $\alpha_P$ as in the invention, those of the aberrations of the movable lens unit which are related to the decentering distortion, namely, astigmatism and Petzval sum, are rapidly lessened. So, good correction may be limited mainly to spherical aberration and coma when a relatively high grade imagery is obtained. In the present invention, therefore, the photographic lens is so designed that the angle of incidence $\alpha_P$ becomes small, with an advantage that the necessary number of constituent lens elements of the movable lens unit is largely reduced. This facilitates a minimization of the size and weight of the movable lens unit. An additional advantage is that the load on the driving system is lessened. Thus, an improvement of the responsiveness is achieved.

Another feature of this embodiment is that, as has been described above, the movable lens unit is constructed with at least one positive lens and at least one negative lens. This enables the spherical aberration and coma of the movable lens unit to be decreased.

Meanwhile, in the equation (b), the term: $-(\frac{1}{2}\alpha'_P)(E(\Delta E) + E^3(\Delta E^3))$ corresponds to the displacement S of the image when the movable lens unit is decentered to E. Of these, if $(\Delta E^3)$ has a large value, the displacement of the image cannot be ignored. Hence, the equation for the image displacement S becomes of third order, making complicated the driving control in compensating for the image displacement.

In the invention, however, the angle of incidence $\alpha_P$ is taken at the small value in the design to permit employment of the equation (m') for ($\Delta E^3$). Since, as has been described above, the movable lens unit is so corrected that its spherical aberration Ip is fundamentally limited to a minimum. As a result, ($\Delta E^3$) can be ignored.

For this reason, in this embodiment, the amount of movement of the movable lens and the amount of displacement of the image have the proportional relationship to each other. This enables the operating mechanism for the movable lens unit to be constructed in an extremely simple form.

In this embodiment of the photographic lens, the decentering distortion is determined by the astigmatism and Petzval sum of the movable lens unit. In many cases, the astigmatism and Petzval sum are so small that the decentering distortion falls below the acceptable level in actual practice. However, as the astigmatism and Petzval sum increase, the decentering distortion problem becomes a serious cause of lowering the image quality.

So, in this embodiment, the focal length $F_2$ of the movable lens unit preferably lies in the following range.

$$0.25F_T < F_2 < 0.8F_T \quad (2)$$

When the condition (2) is satisfied, the astigmatism and Petzval sum of the movable lens unit are well corrected for minimization of the decentering distortion produced. If the refractive power of the movable lens unit becomes too strong beyond the lower limit, large decentering distortion is produced. If the refractive power becomes too weak beyond the upper limit, the required movement of the movable lens unit is increased largely with an objectionable increase of the load on the driving system.

The use of the method of decentering the movable lens unit in the direction perpendicular to the optical axis in compensating for the image displacement as in the invention introduces a situation that the decentered movable lens unit produces a prism effect which results in an opportunity for increasing decentering chromatic aberration of one type corresponding to lateral chromatic aberration.

For this reason, in this embodiment, as the movable lens units comprises positive lenses and negative lenses, it is preferred to set forth ranges for the mean values $\nu_P$ and $\nu_N$ of the Abbe numbers of the materials in the positive and negative lens groups respectively as follows:

$$43 < \nu_P, \text{ and } \nu_N < 40 \quad (3)$$

When the condition (3) is violated, the amount of decentering chromatic aberration produced becomes larger, causing the image quality to be lowered objectionably.

The focusing method employed in the invention is to move the front lens unit I in part or as a whole. This leads to a minimization of the amount of decentering aberration produced over the entire focusing range as will be described later.

Three examples of specific photographic lenses of the invention can be constructed in accordance with the numerical data given in the following tables for the radii of curvature, R, the axial thicknesses or air separations, D, and the refractive indices, N, and Abbe numbers, $\nu$, of the glasses of the lens elements with the subscripts numbered consecutively from front to rear. The used silicon oil has N=1.40590 and $\nu$=52.0.

Numerical Example 1:
F = 300  FNo = 1:2.8  2ω = 8.25°

Fixed Lens unit:

| R1 = 121.60 | D1 = 16.50 | N1 = 1.43387 | ν 1 = 95.1 |
| R2 = −1826.70 | D2 = 1.20 | | |
| R3 = 131.22 | D3 = 16.00 | N2 = 1.49700 | ν 2 = 81.6 |
| R4 = −326.54 | D4 = 2.21 | | |
| R5 = −301.77 | D5 = 5.50 | N3 = 1.72047 | ν 3 = 34.7 |
| R6 = 279.79 | D6 = 34.44 | | |
| R7 = 47.58 | D7 = 6.00 | N4 = 1.58913 | ν 4 = 61.0 |
| R8 = 41.94 | D8 = 38.32 | | |
| R9 = −150.05 | D9 = 6.00 | N5 = 1.80518 | ν 5 = 25.4 |
| R10 = −65.03 | D10 = 2.50 | N6 = 1.61340 | ν 6 = 43.8 |
| R11 = −208.82 | D11 = 31.01 | | |
| R12 = −151.19 | D12 = 5.30 | N7 = 1.76200 | ν 7 = 40.1 |
| R13 = −48.99 | D13 = 2.50 | N8 = 1.62041 | ν 8 = 60.3 |
| R14 = 54.48 | D14 = 9.00 | | |

Movable Lens unit:

| R15 = 63.92 | D15 = 7.44 | N9 = 1.64328 | ν 9 = 47.9 |
| R16 = −52.28 | D16 = 2.50 | N10 = 1.80518 | ν 10 = 25.4 |
| R17 = −217.88 | | | |

Numerical Example 2:
F = 30  FNo = 1:2.8  2ω = 8.25°

| R1 = 121.99 | D1 = 16.81 | N1 = 1.43387 | ν 1 = 95.1 |
| R2 = −574.68 | D2 = 1.22 | | |
| R3 = 119.61 | D3 = 16.30 | N2 = 1.49700 | ν 2 = 81.6 |
| R4 = −432.30 | D4 = 4.21 | | |
| R5 = −316.01 | D5 = 5.60 | N3 = 1.72047 | ν 3 = 34.7 |
| R6 = 278.39 | D6 = 31.90 | | |
| R7 = 45.90 | D7 = 6.11 | N4 = 1.58913 | ν 4 = 61.0 |
| R8 = 40.75 | D8 = 17.40 | | |
| R9 = −250.63 | D9 = 6.11 | N5 = 1.80518 | ν 5 = 25.4 |
| R10 = −75.58 | D10 = 2.55 | N6 = 1.61340 | ν 6 = 43.8 |
| R11 = 92.58 | D11 = 34.16 | | |
| R12 = 285.03 | D12 = 5.40 | N7 = 1.74950 | ν 7 = 35.3 |
| R13 = −116.05 | D13 = 2.55 | N8 = 1.62041 | ν 8 = 60.3 |
| R14 = 82.72 | D14 = 9.17 | | |
| R15 = ∞ | D15 = 2.55 | N9 = 1.51633 | ν 9 = 64.1 |
| R16 = ∞ | D16 = 0.04 | N10 = 1.40590 | ν 10 = 52.0 |
| R17 = ∞ | D17 = 3.97 | N11 = 1.47069 | ν 11 = 67.4 |
| R18 = −284.24 | D18 = 0.51 | | |
| R19 = 76.73 | D19 = 7.58 | N12 = 1.61720 | ν 12 = 54.0 |
| R20 = −115.26 | D20 = 2.55 | N13 = 1.80518 | ν 13 = 25.4 |
| D21 = ∞ | D21 = 14.27 | | |
| R22 = ∞ | D22 = 2.55 | N14 = 1.51633 | ν 14 = 64.1 |
| R23 = ∞ | D23 = 0.04 | N15 = 1.40590 | ν 15 = 52.0 |
| R24 = ∞ | D24 = 4.59 | N16 = 1.51633 | ν 16 = 64.1 |

Numerical Example 3:
F = 300  FNo = 1:2.8  2ω = 8.25°

| R1 = 130.31 | D1 = 15.76 | N1 = 1.43387 | ν 1 = 95.1 |
| R2 = −493.45 | D2 = 0.70 | | |
| R3 = 119.76 | D3 = 18.54 | N2 = 1.49700 | ν 2 = 81.6 |
| R4 = −453.33 | D4 = 3.54 | | |
| R5 = −334.06 | D5 = 5.64 | N3 = 1.72047 | ν 3 = 34.7 |
| R6 = 306.37 | D6 = 31.83 | | |
| R7 = 48.27 | D7 = 6.20 | N4 = 1.58913 | ν 4 = 61.0 |
| R8 = 42.32 | D8 = 17.37 | | |
| R9 = −223.26 | D9 = 6.10 | N5 = 1.80518 | ν 5 = 25.4 |
| R10 = −77.02 | D10 = 2.54 | N6 = 1.61340 | ν 6 = 43.8 |
| R11 = 93.78 | D11 = 35.80 | | |
| R12 = 618.33 | D12 = 5.08 | N7 = 1.80610 | ν 7 = 40.9 |
| R13 = −81.10 | D13 = 3.05 | N8 = 1.60311 | ν 8 = 60.7 |
| R14 = 83.07 | D14 = 11.34 | | |
| R15 = ∞ | D15 = 2.03 | N9 = 1.51633 | ν 9 = 64.1 |
| R16 = ∞ | D16 = 0.10 | N10 = 1.40590 | ν 10 = 52.0 |
| R17 = ∞ | D17 = 2.03 | N11 = 1.51633 | ν 11 = 64.1 |
| R18 = ∞ | D18 = 2.03 | | |
| R19 = 133.15 | D19 = 3.29 | N12 = 1.72000 | ν 12 = 50.2 |
| R20 = 248.23 | D20 = 3.34 | | |
| R21 = −528.04 | D21 = 2.91 | N13 = 1.80610 | ν 13 = 40.9 |
| R22 = −1399.05 | D22 = 0.11 | | |
| R23 = 91.88 | D23 = 7.92 | N14 = 1.57135 | ν 14 = 53.0 |

-continued

Numerical Example 3:
F = 300    FNo = 1:2.8    2ω = 8.25°

| | | | |
|---|---|---|---|
| R24 = −79.67 | D24 = 2.58 | N15 = 1.80518 | ν15 = 25.4 |
| R25 = −237.78 | D25 = 2.03 | | |
| R26 = ∞ | D26 = 2.03 | N16 = 1.51633 | ν16 = 64.1 |
| R27 = ∞ | D27 = 0.10 | N17 = 1.40590 | ν17 = 52.0 |
| R28 = ∞ | D28 = 2.03 | N18 = 1.51633 | ν18 = 64.1 |
| R29 = ∞ | | | |

Figure 4A:
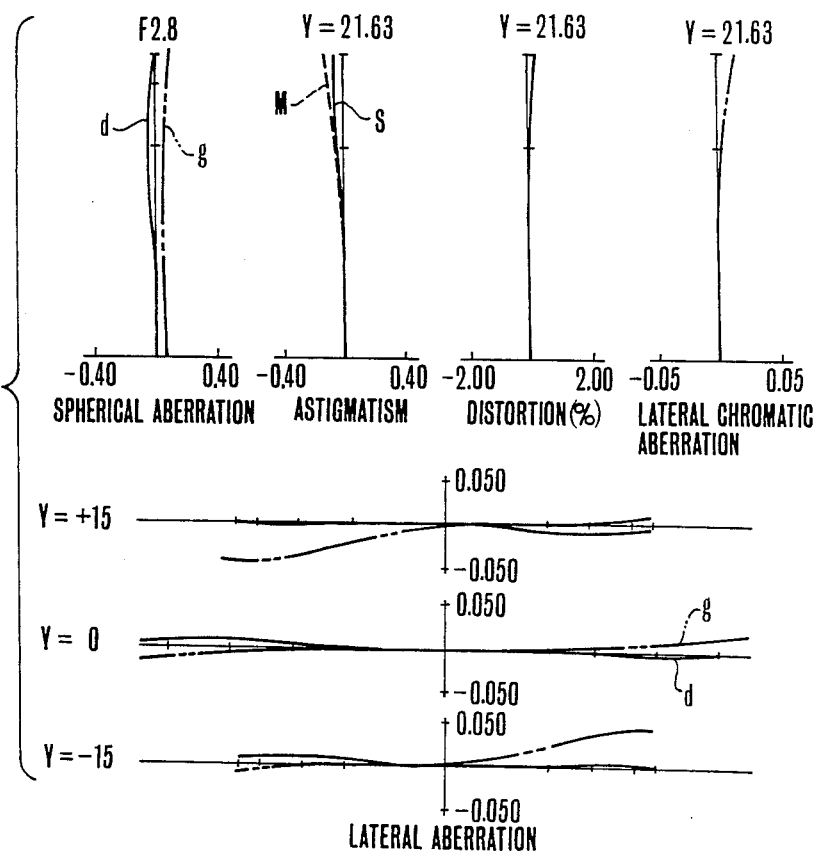
FIGS. 4(A), 4(B); 5(A), 5(B); and 6(A), 6(B) are graphic representations of the aberrations of the lenses of FIGS. 1, 2 and 3 respectively.
Figure 4B:
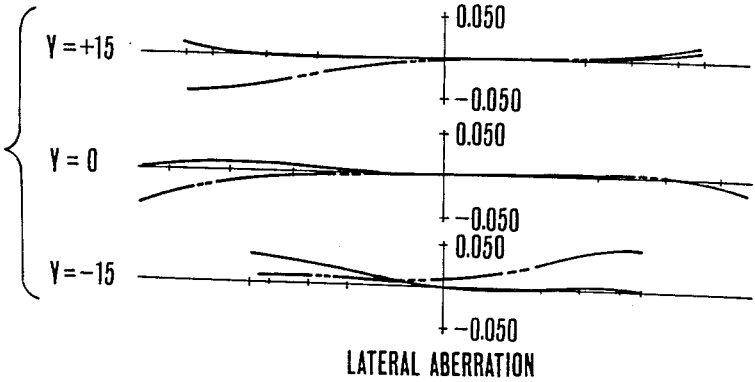
Figure 5A:
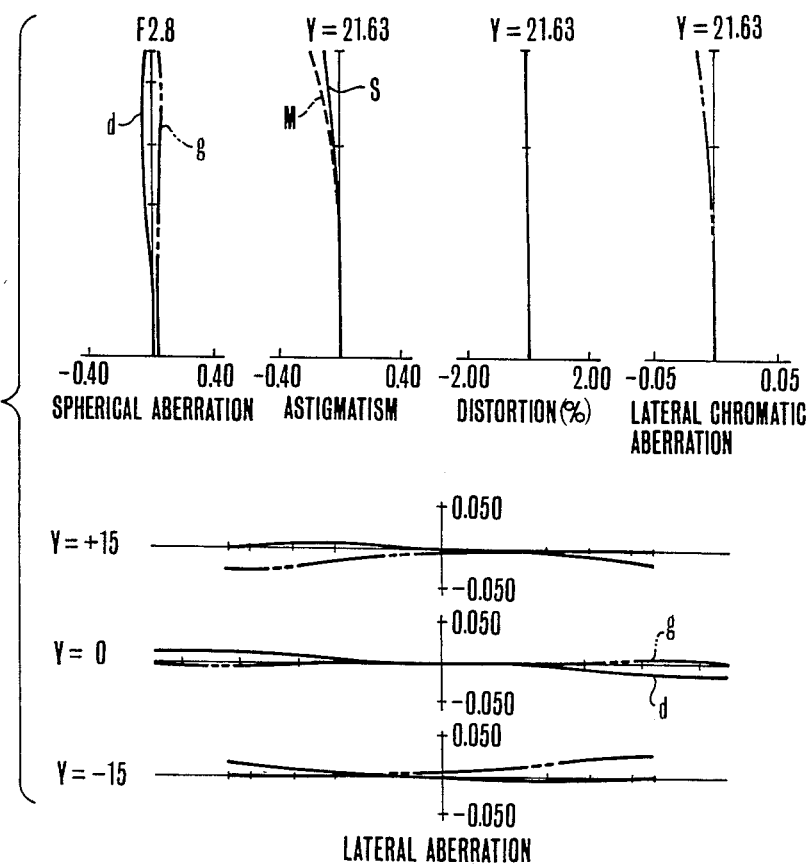
Figure 5B:
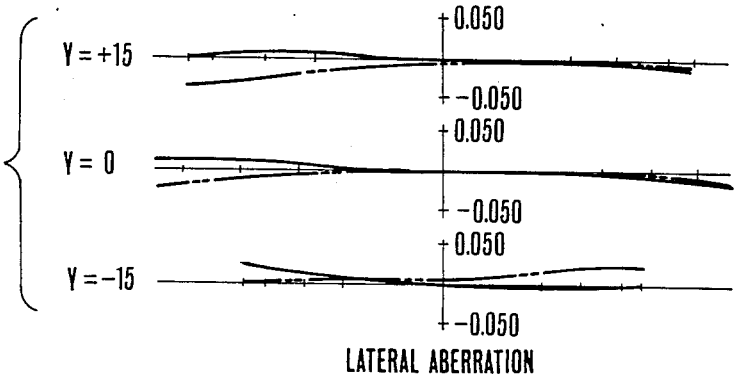
Figure 6A:
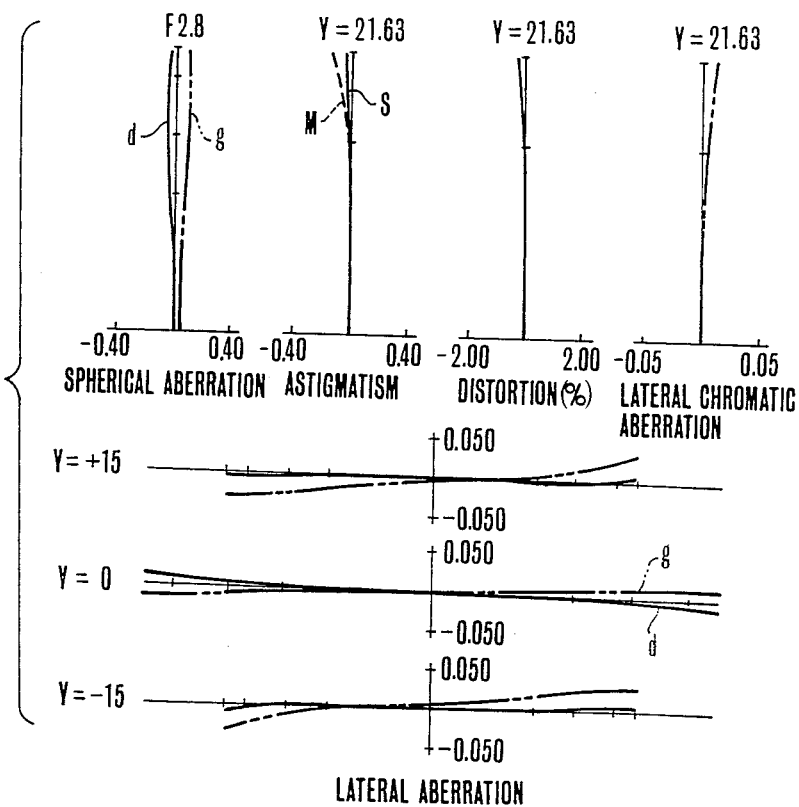
Figure 6B:
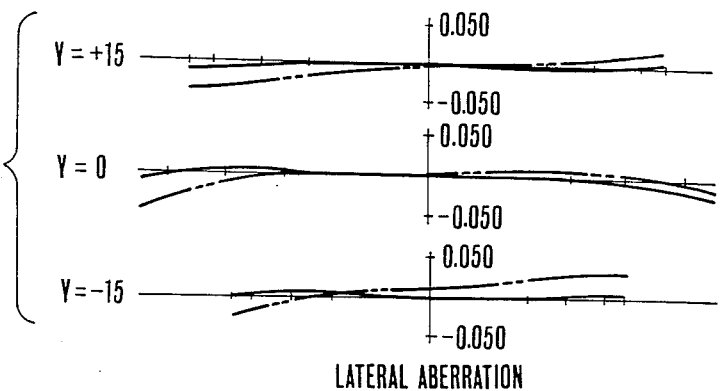

In the numerical example 1 shown in FIG. 1, the movable lens unit II is made constructed with two lenses or positive and negative lenses. With this, even when the movable lens unit II is decentered 2mm to compensate for the image displacement of 2mm, almost no decentering aberrations are produced as shown in FIGS. 4(A) and 4(B). Thus, the optimum optical performance is preserved.

In the case when the movable lens unit II is constructed in the form of a doublet consisting of positive and negative lenses as shown in FIGS. 1 to 3, for the configuration of the doublet in terms of the shape factor $S=(r_B+r_A)/(r_B-r_A)$ where $r_A$ and $r_B$ are the radii of curvature of the front and rear surfaces of the doublet, it is preferred to set forth a range for the shape factor S as follows:

$$0.35 < S < 1.5 \quad (4)$$

When the condition (4) is violated, the variation of the decentering aberrations with movement of the lens unit II becomes larger.

Figure 7:
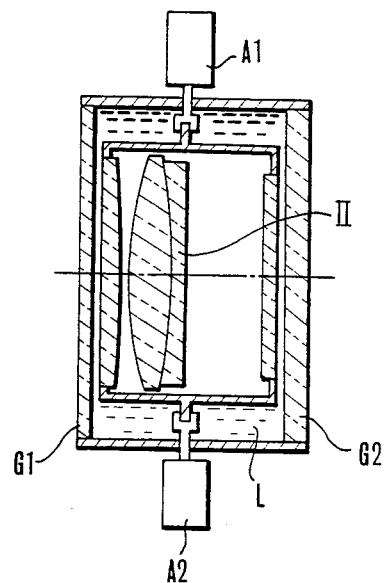
FIG. 7 is a sectional view of a driving system.

In the numerical example 2 shown in FIG. 2, as FIG. 7 depicts only the movable lens unit II with an operating mechanism therefor, a cylinder having the water-tight structure of the 9th and 14th lenses as the front and rear cover glasses G1 and G2 contains silicon oil L in which a water-tight holder of the movable lens unit II is floating. By utilizing a pair of actuators A1 and A2 the movable lens unit II is decentered in the vertical direction. Another pair of actuators is provided for horizontal decentration. These pairs are prevented from interfering with each other by making the push rod flexible, or providing escarpments of the pushing and vertical directions in the linking portions. In this case, the movable lens unit II necessitates the cover glasses for sealing the silicon oil. But, in this example, the cover glass is formed to a plano-convex lens whose flat surface contacts with the oil, thereby the inertial mass of the movable lens unit is reduced.

In the numerical example 3 shown in FIG. 3, the 9th and 16th lenses serve as the cover glasses between which lie the movable lens unit II floating in the silicon oil. The operating mechanism for this movable lens unit is similar to that shown in FIG. 7.

In order that the lens system is adapted to a given type of operating mechanism, a filter or an additional lens unit of weak power may be put in the rear of the lens system. Even in this case, the object of the invention is accomplished. For example, insofar as the focal length F3 of this or third lens unit satisfies the following condition:

$$0.7 F_T < |F_3| \quad (5)$$

the ratio of the image shift S to the movement E of the second lens unit can be adjusted to obtain a optimum driving condition for any of the various actuators.

The foregoing discussion has been directed to the rules of design on the refractive power of each lens unit. In the following, the optical location of the movable lens unit and its resultant aberrations are described.

Figure 8:
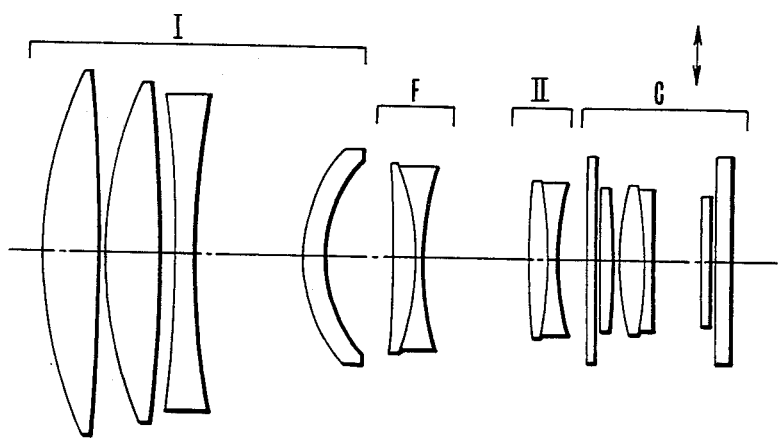
FIG. 8 is a longitudinal section view of the numerical example 2 of a lens of the invention.

For example, the second specific lens system of FIG. 2 may otherwise be considered in FIG. 8, where I denotes a first fixed lens unit followed after the focusing lens unit F by a second fixed lens unit II in front of the movable lens unit C arranged to be decentered or tilted for the purpose of compensating for the image shift. In this embodiment, these four lens units of such functions constitute a telephoto objective of long focal length, and the focusing provision is made at one of the other lens units other than the first lens unit I. That is, the inner focusing method is employed.

And, in this embodiment, the image shift compensating movable lens unit C is preceded by the focusing lens unit F. The use of this arrangement provides a possibility of minimizing the diameter and weight of the movable lens unit C. By this, the lens barrel is prevented from increasing in bulk and size, and the load on the driving system for the movable lens unit C is lessened. Thus, an improvement of the responsiveness to vibratory motions is achieved.

Another advantage is that the amount of aberration produced by decentering the movable lens unit C and the range of variation with focusing of decentering aberrations which would otherwise be large particularly when the inner focusing method is employed are minimized.

Also, the image shift by the decentering of the lens C is made unsusceptible to change of the object distance, or focusing. Thereby, the optical performance is prevented from deteriorating, and the decentering structure for the movable lens unit C is simplified.

Further, in this embodiment, the ratio of the image shift to the movement of the movable lens unit C is maintained constant over the entire decentering range with an advantage of simplifying the manner in which the compensation for the image shift is controlled.

Figure 12:
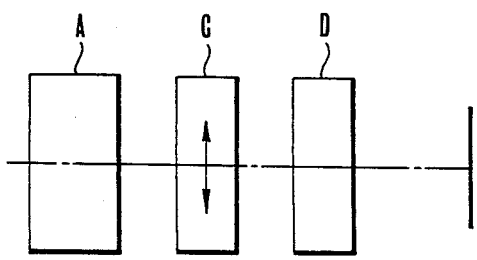
FIG. 12 is a schematic view of lens construction taken to explain decentering aberrations in the invention.

Next taking an example of the lens system shown in FIG. 12 as the general case, what aberrations are produced when the image shift is compensated for by decentering part of the lens system is described from the standpoint of the theory of aberration.

The lens system of FIG. 12 comprises a first fixed lens unit A, a movable lens unit C to be decentered to compensate for the image shift, and a second fixed lens unit D, and has image aberration ΔY.

When the lens unit C is decentered by a distance E without being tilted, the amount of decentering aberration Δ(E) produced is added to the normal ones. The total aberration Δ'Y is given by the expression (a). Here, the amount of decentering aberration ΔY(E) is expressed by the equation (b) in terms of the primary decentering coma (IIE), astigmatism (IIIE), field curvature (PE), distortion (VE1) and distortional surplus aberration (VE2) and the primary original point shift (ΔE). Letting the angles of incidence and emergence of the axial light beam on the movable and second fixed lens units C and D be denoted by αc and ᾱc, and αd and ᾱd respectively, and using the aberration coefficients Ic, IIc, IIIc, Pc and Vc, and Id, IId, IIId, Pd and Vd of the movable and second fixed lens units C and D, the above-identified various aberrations (IIE), (IIIE), (PE) and (ΔE) are expressed by the equations (c) to (f).

$$\Delta'Y = \Delta Y + \Delta Y(E) \quad (a)$$

$$\Delta Y(E) = -\frac{E}{2\alpha_K'}\{R^2(2+\cos 2\phi_R)(IIE) + \quad (b)$$

$$2R(N,\tan W)[\{2\cos(\phi_R-\phi_W)+\cos(\phi_R+\phi_W)\}(IIIE) +$$

$$\cos\phi_R\cos\phi_W(PE)] + (N,\tan W)^2\{(2+\cos 2\phi_W)(VEI) -$$

$$(VE2)\} + (\Delta E)\}$$

$$(IIE) = \alpha_d II_d - \alpha_c(II_c + II_d) - \bar{\alpha}_d I_d + \bar{\alpha}_c(I_c + I_d) \quad (c)$$

$$(IIIE) = \alpha_d III_d - \alpha_c(III_c + III_d) - \bar{\alpha}_d II_d + \bar{\alpha}_c(II_c + II_d) \quad (d)$$

$$(PE) = \alpha_d P_d - \alpha_c(P_C + P_d) \quad (e)$$

$$(\Delta E) = -2(\alpha_d - \alpha_c) \quad (f)$$

The equations (c) to (f) for the decentering aberrations are given by polynomial expressions of the paraxial quantities on the movable and second fixed lenses C and D and the cross aberrations between these lens units.

As is obvious from the equations (c) to (f), even though correction is made in such a way as to minimize the amount of decentering aberration produced for the design object distance, if change of the object distance causes change of the aberration coefficients on the fixed second and movable lenses D and C, the opportunities become greater for increasing the decentering aberration.

Particularly when the fixed second lens unit and the movable lens are used in focusing, the decentering aberration is caused to change with focusing, since the aberration coefficients of these lens units change.

For this reason, in the embodiments of the invention, as shown in FIG. 8, the movable lens C is positioned on the image side of the focusing lens unit F, thereby the decentering aberration correction is stabilized over the focusing range, even though the inner focusing method is employed.

Particularly when focusing to a close object, it is in the embodiments of the invention that the amount of decentering aberration produced is minimized.

Also, of the equations (c) to (f), the last one (f) concerns with the amount of shift of the image on the focal plane when the movable lens unit is moved by a prescribed distance in a direction perpendicular to the optical axis.

As is obvious from the equation (f), when each lens unit is designed as in the embodiments of the invention, the ratio of the amount of image shift and the amount of movement of the movable lens can be made constant. This enables the structure of the decentering mechanism to be simplified easily.

To further reduce the amount of decentering aberration when focusing and when compensating for the image shift, the lens unit F, fixed second lens unit II and the movable lens unit C each are preferably constructed with inclusion of at least one positive and at least one negative lenses of different Abbe number.

In this embodiment, the before-described numerical value relationships (1) to (5) may be additionally satisfied to effect a better result.

This embodiment is applicable to any other type of lens system than that shown in FIG. 8, provided that the movable lens unit C is arranged on the image side of the focusing lens unit F.

Figure 9:
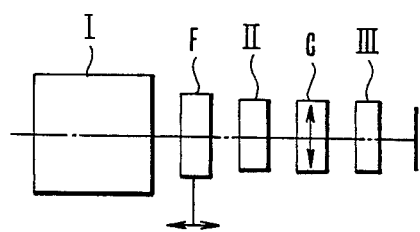
FIGS. 9, 10 and 11 are schematic views of other embodiments of lenses according to the invention.

For example, as shown in FIG. 9, a third fixed lens unit III may be arranged on the image side of the movable lens unit C of the lens system shown in FIG. 8.

Figure 10:
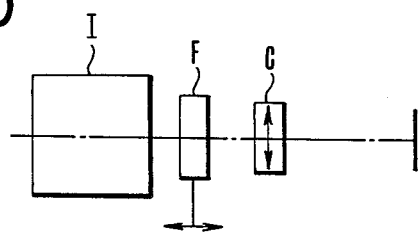
Figure 11:
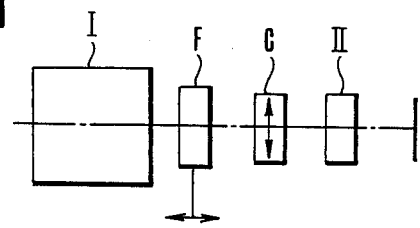

Also, as shown in FIG. 10, the second fixed lens unit II is omitted, leaving the three lens units I, F and C constituting the entire system. Also, as shown in FIG. 11, a second fixed lens unit II may be added to the rear of the movable lens unit C of the lens system of FIG. 10. Even in all these variations, the objects of the invention can be accomplished. The above-described principles of the invention can be applied to shift lenses too.

What is claimed is:

1. An optical system for deflecting an image, comprising:
   a fixed lens unit stationary in a direction perpendicular to an optical axis; and
   a movable lens unit positioned on the image side of said fixed lens unit and decentering away from said optical axis to deflect the image,
   wherein the following conditions are satisfied:

$$4F_T < |F_1|$$

$$0.25F_T < |F_2| < 0.8F_T$$

where $F_T$ is the focal length of the entire lens system, $F_1$ is the focal length of said fixed lens unit, and $F_2$ is the focal length of said movable lens unit.

2. An optical system according to claim 1, wherein said fixed lens unit includes a focusing lens.

3. An optical system according to claim 1, having a function of varying the image magnification, and wherein said focal length $F_T$ of the entire lens system refers to the longest focal length.

4. An optical system according to claim 1, further comprising a third lens unit fixed on the image side of said movable lens unit and satisfying the following condition:

$$0.7F_T < |F_3|$$

where $F_3$ is the focal length of said third lens unit.

5. An optical system according to claim 1, further comprising a detection circuit for detecting deflection of said optical system, wherein said movable lens unit is moved so as to offset displacement of the image on the basis of an output of the detection circuit.

6. An optical system according to claim 1, wherein said movable lens unit includes at least one positive lens unit and at least one negative lens unit.

7. An optical system according to claim 6, satisfying the following conditions:

$$43 < \nu P$$

$$\nu_N < 40$$

where $\nu_P$ and $\nu_N$ are the mean values of the Abbe numbers of said positive and said negative lens units respectively.

8. An optical system according to claim 1, wherein an outermost surface of said movable lens unit is flat, and a lens having said outermost surface has a refractive power.

9. An optical system according to claim 8, wherein said positive and said negative lens units are cemented together to form a cemented lens.

10. An optical system according to claim 9, satisfying the following condition of the shape factor S for said cemented lens:

$$0.35 < S < 1.5$$

where the lens shape factor S is expressed $S=(r_B+r_A)/(r_B-r_A)$, wherein $r_A$ and $r_B$ are the radii of curvature of the frontmost and rearmost surfaces of said cemented lens respectively.

11. A photographic system for deflecting an image, comprising:
  a fixed lens unit stationary in a direction perpendicular to an optical axis;
  a focusing lens unit positioned on the image side of said fixed lens unit and axially movable for focus adjustment; and
  a movable lens unit positioned on the image side of said focusing lens unit and movable for decentering away from said optical axis, said movable lens unit including at least one positive and at least one negative lenses of different Abbe numbers from each other.

12. A photographic system according to claim 11, further comprising a lens unit positioned in between said focusing lens unit and said movable lens unit.

13. A photographic system according to claim 11, further comprising a lens unit positioned on the image side of said movable lens unit.

14. A photographic system according to claim 11, further comprising a detection circuit for detecting deflection of said optical system, wherein said movable lens unit is moved so as to offset displacement of the image on the basis of an output of the detection circuit.

15. A photographic system according to claim 1, satisfying the following conditions:

$$43 < \nu_P$$
$$\nu_N < 40$$

where $\nu_P$ and $\nu_N$ are the mean values of the Abbe numbers of the materials of said positive and said negative lenses respectively.

16. A photographic system according to claim 15, wherein said positive and said negative lenses are cemented together.

* * * * *

UNITED STATES PATENT AND TRADEMARK OFFICE
CERTIFICATE OF CORRECTION

PATENT NO. : 4,844,602

DATED : July 4, 1989

INVENTOR(S) : NOZOMU KITAGISHI ET AL

It is certified that error appears in the above-identified patent and that said Letters Patent is hereby corrected as shown below:

At column 2, line 60, "though." should read --though--.

At column 3, line 5, "aberration $\Delta'$ of" should read --abberation $\Delta'Y$--;

At column 3, line 16, "(VE1)." should read --(VE1),--;

At column 3, line 19, "curvature (PE$^2$) sec-" should read --curvature (PE$^2$), the sec- --; and At column 3, line 62, should read $$-- 2\alpha\rho\alpha'\rho\{\alpha\rho II I\rho - \alpha'\rho II\rho\} - \alpha'^2\rho\{\alpha\rho II\rho - \alpha'\rho I\rho\} --.$$

At column 7, line 39, "A2the" should read --A2, the--.

At column 8, line 53, "$\Delta(E)$" should read --$\Delta Y(E)$--.

UNITED STATES PATENT AND TRADEMARK OFFICE
CERTIFICATE OF CORRECTION

PATENT NO. : 4,844,602

DATED : July 4, 1989

INVENTOR(S) : NOZOMU KITAGISHI ET AL

It is certified that error appears in the above-identified patent and that said Letters Patent is hereby corrected as shown below:

At column 10, line 51, "43 < vP" should read --43 < vp--.

At column 12, line 12, "claim 1," should read --claim 11,--.

Signed and Sealed this

Sixteenth Day of January, 1990

Attest:

JEFFREY M. SAMUELS

*Attesting Officer*   *Acting Commissioner of Patents and Trademarks*